(12) United States Patent
Downey et al.

(10) Patent No.: US 6,318,696 B1
(45) Date of Patent: Nov. 20, 2001

(54) SEAT TRACK LOCKING MECHANISM WITH INFINITE ADJUSTMENT

(75) Inventors: Hugh D. Downey, Barrie; Pascal E. Garrido, Gravehurst; Bryan Jeffrey Conrod, Richmond Hill, all of (CA)

(73) Assignee: Dura Global Technologies, Rochester Hills, MI (US)

(*) Notice: Subject to any disclaimer, the term of this patent is extended or adjusted under 35 U.S.C. 154(b) by 0 days.

(21) Appl. No.: 09/436,080

(22) Filed: Nov. 8, 1999

(51) Int. Cl.[7] ..................................................... F16M 13/00
(52) U.S. Cl. .................... 248/430; 296/65.14; 297/463.1
(58) Field of Search .................................... 248/430, 429, 248/424; 297/463.1; 296/65.14

(56) References Cited

U.S. PATENT DOCUMENTS

| | | | | |
|---|---|---|---|---|
| 4,660,795 | * | 4/1987 | Ikegaya | 248/430 |
| 5,971,342 | * | 10/1999 | Sakai et al. | 248/430 |
| 6,036,267 | * | 3/2000 | Downey et al. | 248/429 X |
| 6,086,154 | * | 7/2000 | Mathey et al. | 248/429 X |
| 6,109,584 | * | 8/2000 | Garrido | 248/429 |
| 6,131,871 | * | 10/2000 | Bernhardt et al. | 248/424 |

* cited by examiner

Primary Examiner—Ramon O. Ramirez
(74) Attorney, Agent, or Firm—C. R. Kiczek

(57) ABSTRACT

A vehicle seat assembly includes a seat bottom and a seat back supported for movement relative to the seat bottom such that seat position can be adjusted forwardly or rearwardly with respect to the vehicle. The seat assembly is mounted a vehicle structure via inboard track and outboard track assemblies. Each track assembly includes a first track and a second track supported for movement relative to the first track. The seat bottom is supported on the second tracks for movement with the second tracks. A locking mechanism is installed on at least one of the track assemblies. The locking mechanism has a spring that is mounted between the first and second tracks. The spring is biased into engagement with the first and second tracks to frictionally retain the second track in a locked position. A handle is manually actuated to move the locking mechanism from the locked position to an unlocked position. The handle applies a force to the spring causing the spring to contract, allowing relative movement between the first and second tracks.

20 Claims, 4 Drawing Sheets

SEAT TRACK LOCKING MECHANISM WITH INFINITE ADJUSTMENT

BACKGROUND OF THE INVENTION

This application relates to a locking assembly that moves between an unlocked position allowing relative movement between two track members and a locked position preventing movement between the members, and more particularly to a locking assembly having resilient member that frictionally retains the track members in the locked position.

Locking assemblies are often used in seat assemblies for controlling movement between track members. Typically a first track member is fixed to a vehicle structure, such as a floor, and a second track member is supported on the first track member for movement relative to the first track member such that the seat position can be adjusted forwardly or rearwardly with respect to the vehicle. The adjustment of the seat assembly is controlled by either a mechanical actuator, an electrical actuator, or an electromechanical actuator.

Locking assemblies are in the locked position to prevent movement between the seat tracks during normal operation of the vehicle. When a seat adjustment is required, the actuator moves the locking assembly to the unlocked position and the second track is allowed to move relative to the first track. When the seat is in the desired position, the locking assembly is returned to the locked position.

Locking assemblies typically have one track member with a plurality of slots or holes spaced along the length of the track. The other track member has a pin or shaft member that is selectively engaged with one of the holes or slots to lock the track members together. When the pin is disengaged from the slot, the tracks can move relative to one another. Once the seat is in the desired position, the pin is re-engaged in a corresponding slot.

One disadvantage with this type of locking assembly is that there are only a finite number of adjustment positions, i.e., each slot defines one adjustment position. Another disadvantage is the potential for seat chuck caused by longitudinal play resulting from a loose fit between the pin and the slots. A slight rocking movement of the seat in a locked position can also cause undesirable noise. Finally, the locking mechanism on the inboard track assembly can become misaligned with the locking mechanism on the outboard track assembly, which causes the seat to be locked in a cocked position.

Thus, it is desirable to have a locking assembly that can be adjusted to an infinite number of adjusted positions to accommodate various occupant heights. It is also desirable to have a locking assembly that eliminates seat chuck, lock misalignment, and which is quiet in operation.

SUMMARY OF THE INVENTION

In a disclosed embodiment, a locking assembly includes a first track, a second track supported for movement relative to the first track, and a locking mechanism having a resilient member. The resilient member is biased into engagement with the first and second tracks to frictionally retain the second track in a locked position. The assembly includes an actuator that is mounted to one of the first or second tracks and which selectively moves the locking mechanism into an unlocked position by applying a force to the resilient member to decrease frictional forces between the resilient member and the tracks to allow relative movement between the first and second tracks.

In the preferred embodiment, the resilient member is a spring having a main body portion supported between the first and second tracks. The body portion is expandable to a nominal position creating high frictional forces between the spring and the tracks to define the locked position. The body portion is contractible to a release position where frictional forces between the spring and the tracks are decreased to allow relative movement between the tracks.

The subject locking assembly provides a simplified locking assembly that is infinitely adjustable, quiet to operate, and which eliminates seat chuck and misalignment. These and other features can be understood from the following specification and drawings.

DETAILED DESCRIPTION OF THE PREFERRED EMBODIMENT

Figure 1:
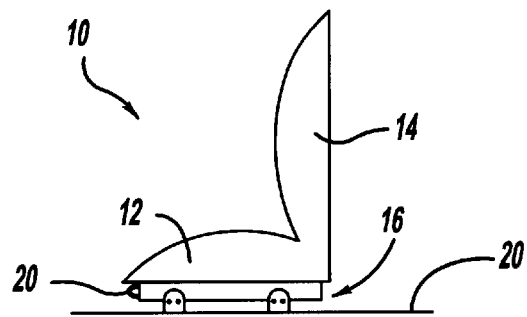
FIG. 1 is a side schematic view of a seat mounted to a vehicle structure on an adjustable track assembly.

A vehicle seat assembly is shown generally at 10 in FIG. 1. The seat assembly 10 includes a seat bottom 12 and a seat back 14 supported with respect to the seat bottom 12. A seat mounting assembly 16 is used to mount the seat assembly 10 to the vehicle and includes a first track 18 that is mounted to a vehicle structure 20, such as a floor, and a second track 22 that slides with respect to the lower track 18. The seat bottom 12 is supported on the second track 22 for movement with the second track 22 for seat adjustment in a forward or rearward position. Preferably, the first track 18 is an inner track and the second track 22 is an outer track, however, it should be noted that the terms forward, rearward, inner, and outer, as used in this description, are for illustration purposes only and cannot be considered limiting.

The mounting assembly 16 includes track assemblies on an inboard side 24 and an outboard side 26 of the seat assembly 10. An actuator 28 is used for selectively controlling the movement of the second track 22 with respect to the first track 18. The actuator 28 is preferably a handle or towel bar, accessible by a seat occupant, that is operably connected to both the inboard 24 and outboard 26 track assemblies. While a towel bar is preferred, a mechanical lever, rotary handle, cable, or other actuator known in the art could also be used. While a manual type seat actuator is shown, it should be understood that the subject invention could also be used in conjunction with an electrical seat adjuster assembly or an electromechanical seat adjuster assembly. Also, the terms inboard and outboard are used in this description for clarity and illustration purposes only and cannot be considered limiting.

Figure 2:
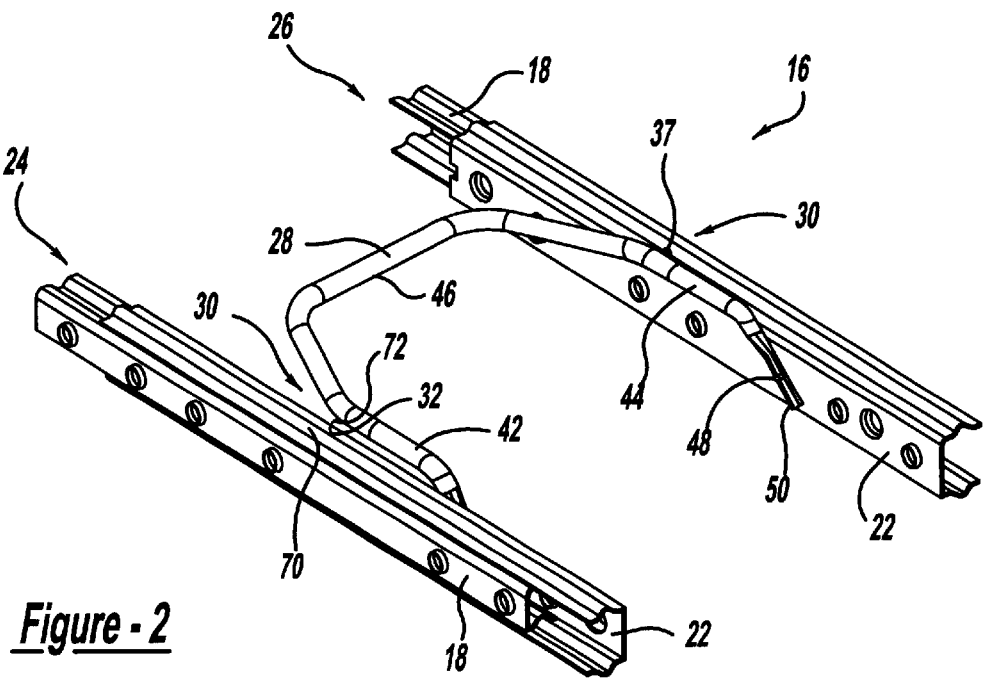
FIG. 2 is a perspective view of a seat track assembly incorporating the subject locking mechanism.
Figure 3:
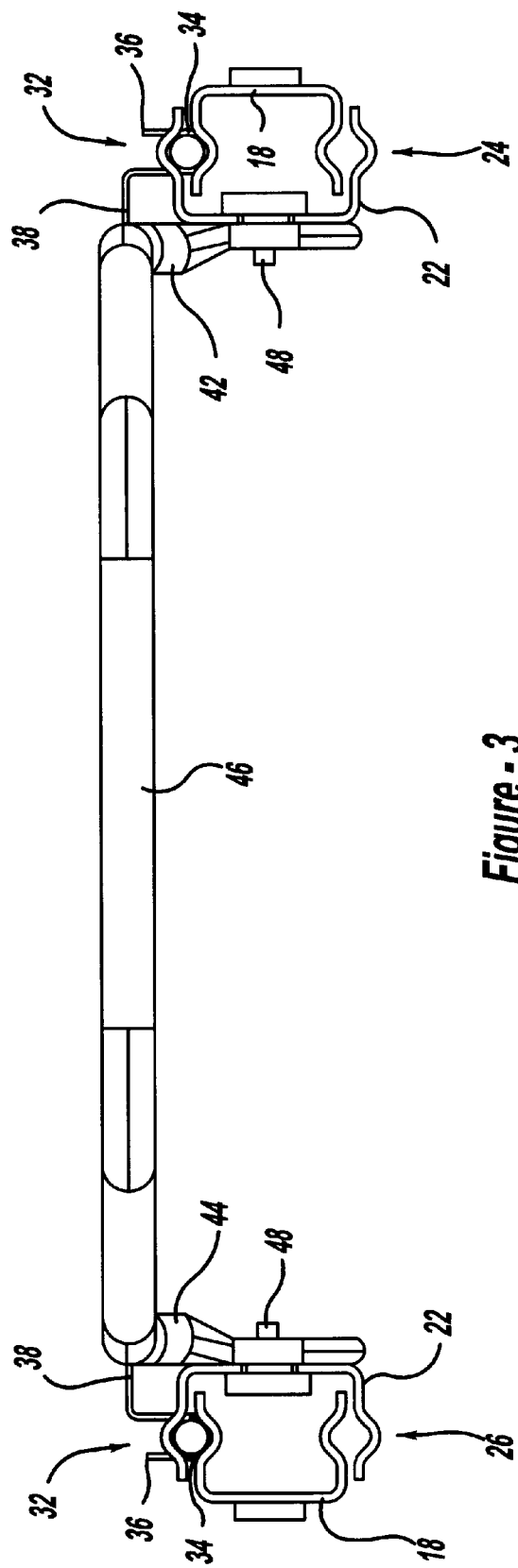
FIG. 3 is a front view of the seat track assembly of FIG. 2 in partial cross-section.

The mounting assembly 16 includes a locking assembly 30 that is moveable between a locked position where the locking assembly 30 prevents relative movement between the first 18 and second 22 tracks and an unlocked position where the second track 22 is movable relative to the first track 18. The locking assembly 30 can be located on either the inboard 24 or outboard 26 track assembly, or a locking assembly 30 can be installed in both track assemblies. In the preferred embodiment, a locking mechanism 30 is installed on both the inboard 24 and outboard 26 track assemblies, as shown in FIGS. 2–3.

The locking assembly 30 includes a resilient member 32 that is biased into engagement with the first 18 and second 22 tracks to frictionally retain the second track 22 in the locked position. The actuator 28 is mounted to the second track 22 and is selectively actuated to move the locking assembly 30 into an unlocked position by applying a force to the resilient member 32 to decrease frictional forces between the resilient member 32 and the tracks 18, 22 to allow the second 22 track to move horizontally with respect to the first track 18.

The resilient member 32 can be any type of resilient member known in the art including a bladder, leaf spring, or double torsion spring. Preferably, the resilient member 32 is comprised of a single torsion spring or a plurality of single torsion springs.

Figure 4:
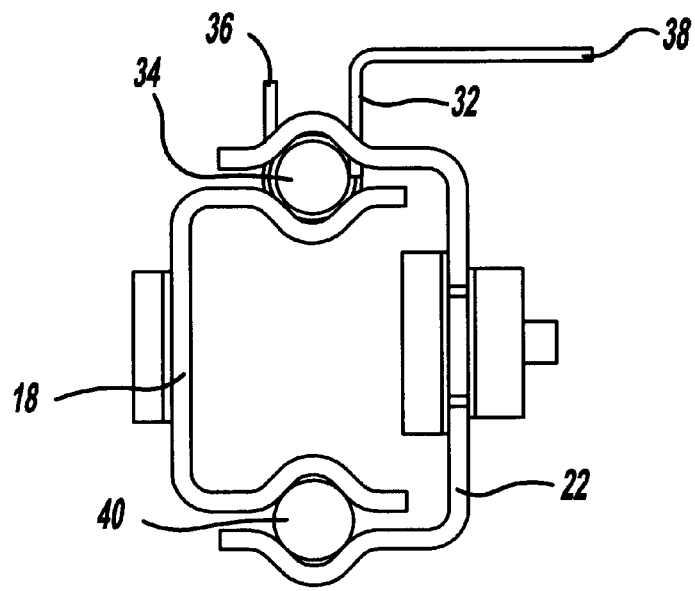
FIG. 4 is a front cross-sectional view, partially cut-away, of the locking mechanism of FIG. 2 in a locked position.
Figure 5:
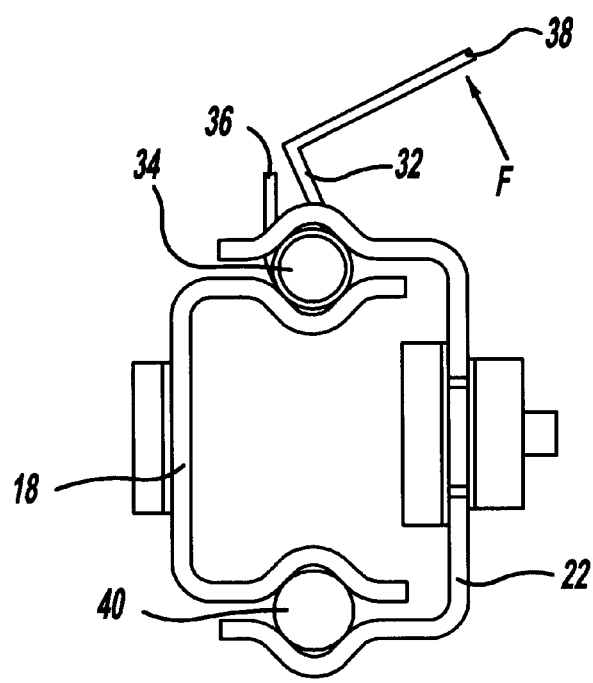
FIG. 5 is a front cross-sectional view, partially cut-away, of the locking mechanism of FIG. 2 in an unlocked position.

As shown in FIGS. 4–5, the spring 32 has a main body portion 34 that is supported between the first 18 and second 22 tracks. The body portion 34 is expandable to an installed or nominal position where the body 34 engages the first 18 and second 22 tracks. This engagement creates high frictional forces between the spring 32 and the tracks 18, 32, which prevents relative movement between the tracks 18, 22, i.e. the tracks 18, 22 are locked together (FIG. 4). The actuator 38 applies a force to contract the body portion 34 to a release position, allowing thee second track 22 to move relative to the first track 18 (FIG. 5). As the body portion 34 is contracted, the frictional forces between the spring 32 and the tracks 18, 22 is decreased to allow the horizontal movement.

The spring 32 includes a first spring end 36 that is fixed to the track 22 and a second spring end 38 that is fixed to the actuator 28. Preferably, the first spring end 36 is received in a notch 70 formed in the second track 22 and the second spring end 38 is received in an opening 72 in the actuator, however, other known attachment methods could also be used. As the actuator 28 is pivoted upwardly, a force "F" is applied to the second spring end 38 causing the second spring end 38 to rotate. Because the first spring end 36 is fixed to the track 22, the force applied to the second spring end 38 causes the body portion 34 to contract, i.e. coils tighten.

As shown in FIGS. 4–5, the second track 22 is movably supported on the first track 18 by a plurality of ball bearings 40 having a pre-determined bearing diameter. The ball bearings 40 are installed between the tracks 18, 22 and should have a diameter large enough to prevent the track members 18, 22 from scraping against each other when the seat 10 is being adjusted. While a ball bearing support is preferred, it should be understood that other track sliding support mechanism known in the art could also be used.

As discussed above, the spring 32 is preferably a single torsion or coil spring with the body portion 34 having an initial diameter that is greater than the bearing diameter when the locking assembly 30 is in the locked position. Thus, the coil spring 32 is biased to expand outwardly to a larger diameter than the bearing diameter to frictionally engage and lock the tracks 18, 22 together. The body portion 34 has a reduced diameter that is less than the bearing diameter when the locking assembly 30 is in the unlocked position. The actuator 28 applies a force large enough to overcome the initial spring force to cause the body portion 34 to contract to the reduced diameter and allow horizontal seat adjustment.

As shown in FIGS. 2–3, the actuator 28 is a towel bar having a first leg 42 pivotally attached to the second track 22 of the inboard track assembly 24 and a second leg 44 pivotally attached to the second track 22 of the outboard track assembly 26. The first 42 and second 44 legs are interconnected by a handle portion 46 that is manually actuated by a seat occupant. The legs 42,44 are pivotally attached to the tracks 22 via a tab extension 48. The tab extension 48 is received in a slot 50 in each of the legs 42, 44. While a tab 48 attachment is preferred, a pivot pin and hole attachment, a rivet attachment, or a bracket and tab attachment could also be used.

The spring 32 has a first portion fixed to the second track 22 and second portion fixed to one of the legs 42, 44. As the handle portion 46 pivots the legs 42, 44 relative to the second track 18, the spring 32 contracts, moves from the initial diameter to the reduced diameter, to allow horizontal seat adjustment.

Figure 6:
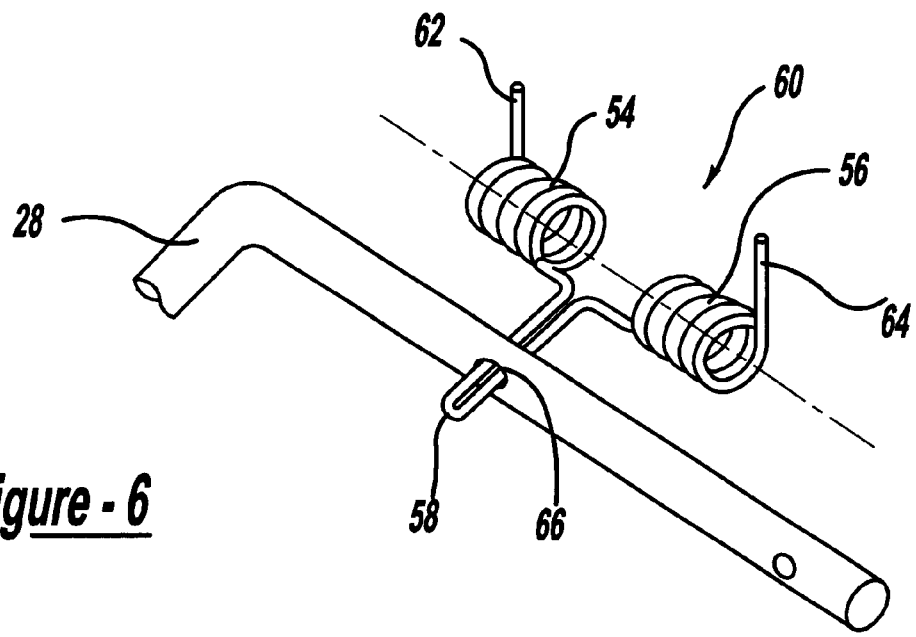
FIG. 6 is a perspective view of an alternate embodiment locking mechanism.

An alternate embodiment of the resilient member 32 is shown in FIG. 6. In this configuration the resilient member 32 is a spring 60 having a first body portion 54 and a second body portion 56 interconnected by a extension arm 58. The first 54 and second 56 body portions are supported between the first 18 and second 22 tracks and are expandable to the installed or nominal position where the initial diameter is larger than the bearing diameter. This locks the tracks 18, 22 together. When the actuator is pivoted upwardly, the body portions 54, 56 contract to a reduced diameter to allow horizontal seat adjustment. The spring 60 includes first 62 and second 64 spring arms that are fixed to the second track 22 while the extension arm 58 is mounted to the actuator 28. The extension arm is preferably a looped portion that is received within an opening 66 in the actuator 28.

Figure 7:
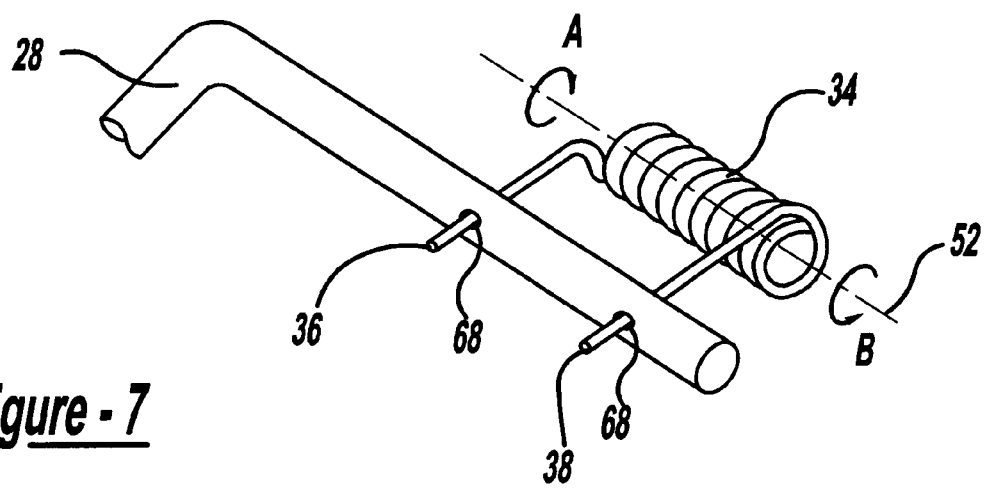
FIG. 7 is a perspective view of an alternate embodiment locking mechanism.

An alternate embodiment of the resilient member 32 is shown in FIG. 7. In this configuration the body portion 34 defines a longitudinal axis of rotation 52 and the first 36 and second 38 spring ends are both attached to the actuator 28. The ends 36, 38 are preferably received in openings 68 in the actuator 28. As the actuator 28 moves the body portion 34 to a release position, the first spring end 36 contracts one part of the body portion 34 in a first direction about the axis 52, indicated by arrow A, and the second spring end 38 contracts another part of the body portion 34 in a second direction, opposite from the first direction and indicated by arrow B, about the axis 52. The movement of the body portion 34 in opposing directions creates a wringing or twisting effect that overcomes the initial spring force and causes the body portion 34 to contract to the reduced diameter to allow the second track 22 to move relative to the first track 18.

Preferred embodiments of this invention have been disclosed, however, a worker of ordinary skill in the art would recognize that certain modifications would come within the scope of this invention. For that reason the following claims should be studied to determine the true scope and content of this invention.

We claim:

1. A locking assembly for a vehicle seat track comprising:
   a first track;
   a second track supported for movement relative to said first track;
   a locking mechanism having a resilient member biased into engagement with said first and second tracks to frictionally retain said second track in a locked position; and an actuator mounted to one of said first or second tracks for selectively moving said locking mechanism into an unlocked position by applying a force to said resilient member to decrease frictional forces between said resilient member and said tracks to allow relative movement between said first and second tracks.

2. An assembly as recited in claim 1 wherein said resilient member is a spring having a main body portion supported between said first and second tracks, said body portion being expandable to a nominal position creating high frictional forces between said spring and said tracks to define said locked position and contractible to a release position decreasing frictional forces between said spring and said tracks to define said unlocked position.

3. An assembly as recited in claim 2 wherein said spring includes a first spring end fixed to said track member and a second spring end fixed to said actuator.

4. An assembly as recited in claim 2 wherein said second track is movably supported on said first track by a plurality of ball beatings having a pre-determined bearing diameter.

5. An assembly as recited in claim 4 wherein said spring is a coil spring with said body portion having an initial diameter that is greater than said bearing diameter when said locking mechanism is in said locked position and a reduced diameter that is less than said bearing diameter when said locking mechanism is in said unlocked position.

6. An assembly as recited in claim 5 wherein said actuator is a handle having at least one leg pivotally attached to said second track and wherein said coil spring has a first spring end fixed to said second track and second spring end fixed to said leg such that as said handle pivots relative to said second track said second spring end causes said body portion to contract from said initial diameter to said reduced diameter.

7. An assembly as recited in claim 2 wherein said body portion defines a longitudinal axis of rotation and wherein said spring includes first and second spring ends that are attached to said actuator such that said first spring end contracts said body portion in a first direction about said axis and said second spring end contracts said body portion in a second direction, opposite from said first direction, about said axis as said actuator moves said body to the release position.

8. An assembly as recited in claim 1 wherein said resilient member is a spring having a first body portion and a second body portion interconnected by a extension arm, said first and second body portions being supported between said first and second tracks and being expandable to a nominal position creating high frictional forces between said spring and said tracks to define said locked position and contractible to a release position decreasing frictional forces between said spring and said tracks to define said unlocked position.

9. An assembly as recited in claim 8 wherein said spring includes first and second spring arms that are fixed to said second track while said extension arm is mounted to said actuator.

10. An assembly as recited in claim 1 wherein said resilient member is mounted between said first and second tracks.

11. An assembly as recited in claim 1 wherein said second track is frictionally retainable in an infinite number of locked positions.

12. A vehicle seat assembly comprising a seat bottom;

a seat back supported relative to said seat bottom;

inboard track and outboard track assemblies mounted to a vehicle structure and each including a first track and a second track supported for movement relative to said first track, said seat bottom being supported on said second tracks for movement therewith;

a first locking mechanism for said inboard track assembly and a second locking mechanism for said outboard track assembly, each of said locking mechanisms including a resilient member mounted between said first and second tracks where said resilient member is biased into engagement with said first and second tracks to frictionally retain said second track in a locked position; and an actuator mounted to one of said first or second tracks for selectively moving said locking mechanisms into an unlocked position by applying a force to said resilient members to contract said resilient members to allow relative movement between said first and second tracks.

13. An assembly as recited in claim 12 wherein said actuator is a towel bar having a first leg pivotally attached to said second track of said inboard track assembly and a second leg pivotally attached to said second track of said outboard track assembly, said first and second legs being interconnected by a handle portion.

14. An assembly as recited in claim 13 wherein said resilient member has a first portion fixed to said second track and second portion fixed to one of said legs such that as said handle portion pivots said legs relative to said second track said resilient member contracts to decrease frictional forces between said resilient member and said first and second tracks.

15. An assembly as recited in claim 12 wherein said second track is movably supported on said first track by a plurality of ball bearings having a pre-determined bearing diameter.

16. An assembly as recited in claim 15 wherein said spring is a coil spring with a body portion having an initial diameter that is greater than said bearing diameter when said locking mechanism is in said locked position and a reduced diameter that is less than said bearing diameter when said locking mechanism is in said unlocked position.

17. An assembly as recited in claim 16 wherein said coil spring has a first spring end received in a notch in said second track and a second spring end received in an aperture in said actuator.

18. An assembly as recited in claim 16 wherein said coil spring has first and second spring ends that are connected to said actuator wherein said first spring end applies a rotational force to said body portion and said second spring end applies an opposing rotation force to said body portion.

19. An assembly as recited in claim 15 wherein said resilient member is a spring having a first body portion and a second body portion interconnected by a extension arm, said first and second body portions being supported between said first and second tracks and being expandable to a nominal position creating high frictional forces between said spring and said tracks to define said locked position and contractible to a release position decreasing frictional forces between said spring and said tracks to define said unlocked position.

20. An assembly as recited in claim 12 wherein said second track is frictionally retainable in an infinite number of locked positions.

* * * * *